May 14, 1929.
J. JONAS
APPARATUS FOR OBTAINING DIRECT CURRENT FROM ALTERNATING CURRENT BY MEANS OF POLYPHASE RECTIFIERS
Filed Aug. 29, 1921

1,712,502

Inventor
J. Jonas,
By Marks & Clerk
Attys.

Patented May 14, 1929.

1,712,502

UNITED STATES PATENT OFFICE.

JULIUS JONAS, OF BADEN, SWITZERLAND, ASSIGNOR TO AKTIENGESELLSCHAFT BROWN, BOVERI & CIE., OF BADEN, SWITZERLAND.

APPARATUS FOR OBTAINING DIRECT CURRENT FROM ALTERNATING CURRENT BY MEANS OF POLYPHASE RECTIFIERS.

Application filed August 29, 1921, Serial No. 496,278, and in Germany May 6, 1914.

The previously proposed mercury vapour rectifiers which are supplied with polyphase alternating current have several drawbacks which it is the object of the present invention to remove.

More generally, the object of the present invention is to provide an improved current-rectifying system which has better characteristics of operation than such systems proposed heretofore.

One of the drawbacks referred to above consists in this, that in order to obtain a direct current having a higher harmonic of the least possible amplitude, the number of phases, if need be by the production of additional intermediate phases, must be made very great. An equal number of anodes or groups of anodes must also be provided corresponding to the number of phases. Now it is a property of the rectifier, however, that two anodes of different phases never pass current at the same time but that each anode passes current during a period of the alternating current for a fraction of the time thereof. This fraction of time $= \frac{t}{m}$ seconds, where $t$ is the time of a period, $m$ the number of phases. The value of the current for each phase is consequently highly unsatisfactory and the effective value of the current decreases to an exceptional degree with the rise in the number of phases. A limit is therefore set to the increase of the number of phases owing to the decline in the relative output of which the rectifier installation is capable.

Figures 3, 4A, 4B, 4C:
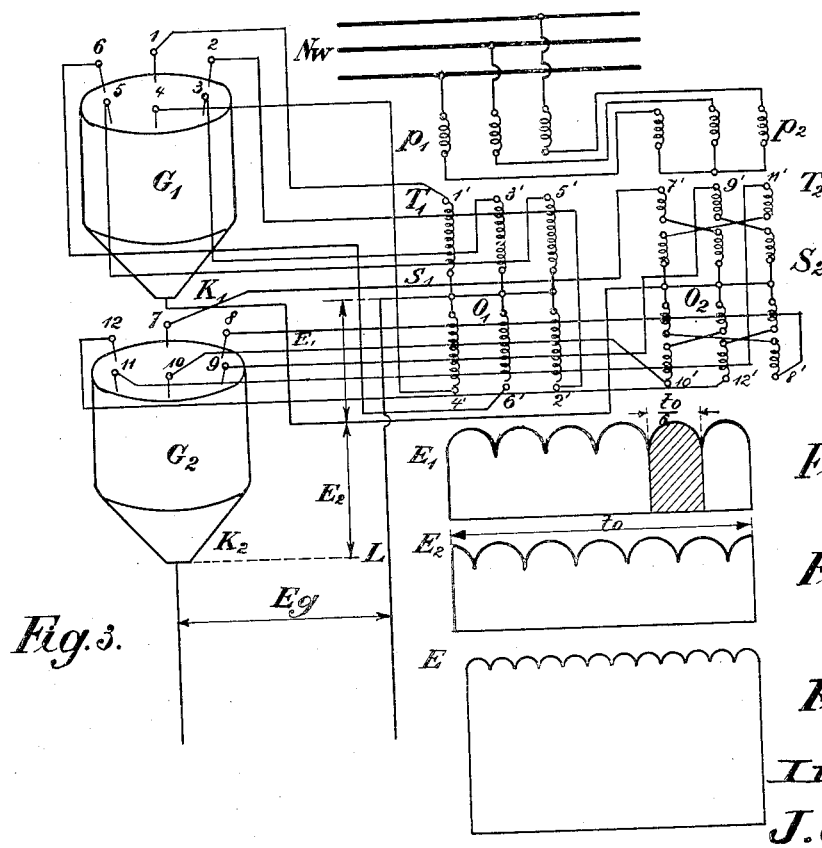
Figure 3 shows diagrammatically another embodiment of the present invention wherein supply transformers similar to those shown in Figure 1, are connected to two series-connected vapour rectifiers, each of which has one-half the number of anodes of the rectifier shown in Figure 1.

Figures 4ª and 4ᵇ represent respectively the direct current voltages of the two vapour rectifiers of Figure 3.

Figure 4ᶜ represents the combination of the voltages shown in Figures 4ª and 4ᵇ.

Figures 1, 2:
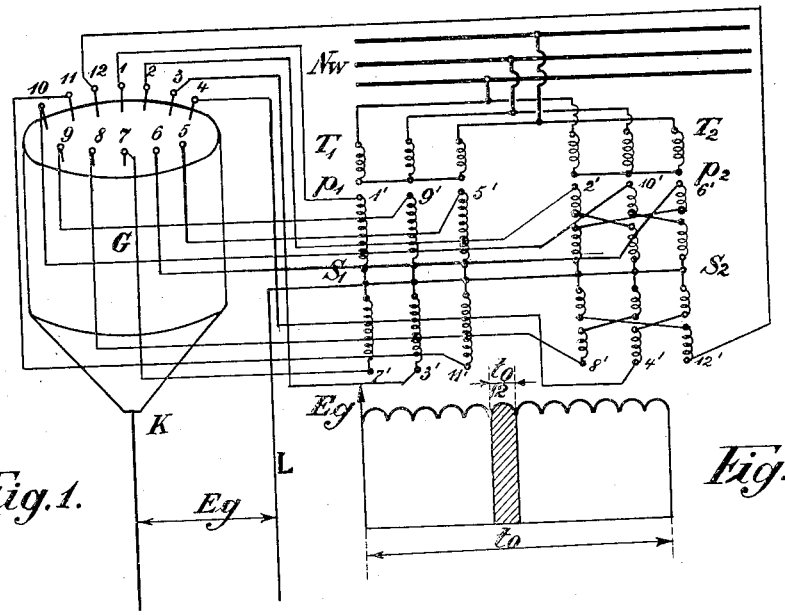
Figure 1 shows diagrammatically a current-rectifying system embodying the present invention and wherein a twelve anode vapour rectifier is associated with a supply transformer fed from three-phase supply lines.
Figure 2 is the direct current curve of the rectifier plotted against time.

In the embodiment of the invention shown in Figure 1, a rectifier G is supplied with 12-phase current and has anodes 1, 2, 3 . . . 12 which are connected as shown to the ends 1', 2', 3' . . . 12' of the secondary windings $s_1$ and $s_2$ of the transformer $T_1$ and $T_2$. The transformer $T_2$ is connected up as a secondary to a phase combination of the kind such that the secondary phases of this transformer form an angle of 30° with those of the transformer $T_1$. In this manner two systems are obtined which together make up a regular 12-phase system. The constant potential or direct current curve of this rectifier which can be taken off between the cathode K and the neutral wire L is plotted in Figure 2 as a function of the time. It is seen that the direct current has a higher harmonic with a frequency of 12. Each of the 12 anodes passes current during the time $t = \frac{t_o}{12}$, $t_o$ being the time of one period.

In the embodiment of the invention shown in Figure 3, $G_1$ and $G_2$ are two polyphase mercury vapour rectifiers each having, as compared with the rectifier in the embodiment of Figure 1, only half the number of anodes, namely the anodes 1, 2, 3, 4, 5, 6 and 7, 8, 9, 10, 11, 12, respectively, and the cathodes $K_1$, $K_2$ respectively. $T_1$ and $T_2$ are two primary transformers connected up in series, but which could also be placed in parallel to the three-phase mains $N_W$. Each of the secondary windings $s_1$ and $s_2$ is made 6-phase but $s_2$ by phase combination gives potentials the phases of which are displaced by 30° with respect to $s_1$, so that $s_1$ and $s_2$ considered as a whole constitute a symmetrical 12-phase system. The ends of $s_1$, namely 1', 2' . . . 6', are connected with the corresponding anodes of $G_1$, while the ends 7', 8' . . . 12' of $s_2$ are connected to the corresponding anodes of $G_2$ and both of these rectifiers connected up, for instance, in series in a known manner so that the star point $O_2$ of $s_2$ is connected to the cathode $K_1$, the direct current voltage $E_g$ being taken off between the star point $O_1$ or line L and $K_2$. This direct current voltage is in this case composed of two direct current voltages $E_1$ and $E_2$ each of which can be designed to suit the maximum rectifier voltage which is practically attainable. The voltage $E_1$ as well as the voltage $E_2$ when considered by itself displays a higher harmonic having a frequency of 6, but the two higher harmonics as regards their frequency are displaced from each other by 180° (Figures $4^a$ and $4^b$). By means of the self-induction always present in these circuits the course of these higher harmonics is approximately of sine form, so that when connected up in series the voltages of the two higher harmonics owing to the 180° displacement compensate each other completely. When the original form of curve is considered to depart from the sine form then the resultant of both curves is a higher harmonic of a frequency of 12 (Figure $4^c$) such as is obtained with the 12-phase rectifier shown in Figure 1. The embodiment of the invention in Figure 3 wherein each anode of the rectifiers $G_1$ and $G_2$ passes current during the time $= \frac{1}{6}$ of the duration of the period, has the possible advantage over the embodiment in Figure 1 wherein this time only amounts to $\frac{1}{12}$ of the time of the period. The effective value of the current for each phase is therefore greater in the embodiment in Figure 3 and the supply transformer might have a correspondingly smaller amount of copper than in the embodiment of the invention shown in Figure 1. The additional advantages of the embodiment in Figure 3 may be summarized as follows:—

1. The voltage of the direct current mains is distributed over two or more rectifiers.

2. The higher harmonic is eliminated or corresponds with a frequency equal to the sum of the number of phases of all the rectifiers connected up in series.

3. The time during which the anodes pass current is equal to the time of a period of the alternating current supplied divided by the number of phases of one rectifier.

It is not necessary that the number of phases of the different rectifiers connected up in series be equal. Rectifiers having any number of phases, for instance, can also be connected up in series, it being only necessary in doing so to ensure that there are differences in phase between the alternating current voltages of the rectifiers which are connected up in series. The rectifiers which are connected up in series may also be built up together to form a unit so that externally the rectifier group with the transformer belonging to it will not differ appreciably from the usual well-known arrangement. The vacuum vessels or cells may be connected together in any suitable manner, for instance by tubes, in such a manner that they can be exhausted together by a single pump. They may likewise be cooled by a cooling system common to them all.

Having now described my invention, what I claim as new and desire to secure by Letters Patent is:—

1. In a rectifying system, a polyphase line having a limited number of phases, a first rectifier unit, a second rectifier unit, each rectifier unit having a cathode and a plurality of co-operating anodes at least equal in number to the number of phases of said line, and a transformer unit having a polyphase primary winding connected to said line and a secondary star-connected winding comprising a plurality of star-connected phase windings, the phase windings associated with each rectifier unit being equal in number to the number of anodes thereof and having a neutral star terminal and a pluarlity of star-end terminals severally connected to the anodes of the associated rectifier unit, the secondary phase windings associated with one rectifier unit being displaced in phase against the corresponding phase windings associated with the other rectifier unit, and each comprising two serially-connected winding portions inductively related respectively to different primary phases of said transformer unit, the free end of one of said winding portions being connected to the associated neutral star terminal, the free end of the other of said winding portions constituting one of said star-end terminals, means for connecting the cathode of the first rectifier unit to the neutral star terminal of the secondary phase windings associated with the second rectifier unit, and means for so serially-connecting a direct-current load between the neutral point of the secondary phase windings associated with the first rectifier unit and the cathode of the second rectifier unit that the entire direct-current to the load from one of said rectifier units flows through the other.

2. In a rectifying system, a polyphase line having a limited number of phases, a first rectifier unit, a second rectifier unit, each rectifier unit having a cathode and a plurality of co-operating anodes at least equal in number to the number of phases of said line, and a transformer unit having a polyphase primary winding connected to said line and a symmetrical secondary winding comprising a plurality of symmetrical star-connected phase windings, the phase windings associated with each rectifier unit being equal in number to the number of anodes thereof and having a neutral star terminal and a plurality of star-end terminals severally connected to the anodes of the associated rectifier unit, the secondary phase windings associated with one rectifier unit being displaced in phase against the corresponding phase windings associated with the other rectifier unit by an angle substantially equal to half the phase angle between the secondary phases, and each comprising two serially-connected winding portions inductively related respectively to different primary phases of said transformer unit, the free end of one of said winding portions being connected to the associated neutral star terminal, the free end of the other of said winding portions constituting one of said star-end terminals, said polyphase primary winding comprising a first set of star-connected primary phase windings associated with the secondary phase windings feeding the second rectifier unit and a second set of primary phase windings associated with the secondary phase windings feeding the first rectifier unit and connected respectively to the free ends of said star-connected primary phase windings and to the phases of said polyphase line, means for connecting the cathode of the first rectifier to the neutral star terminal of the secondary phase windings associated with the second rectifier unit, and means for so serially-connecting a direct-current load between the neutral point of the secondary phase windings associated with the first rectifier unit and the cathode of the second rectifier unit that the entire direct-current to the load from one of said rectifier units flows through the other.

3. In a polyphase rectifying installation having a number of rectifier anodes greater than the number of phases of the alternating-current supply means, a transformer having a primary winding connected to said supply means and a secondary winding connected to said anodes, each phase of said secondary winding being symmetrically composed of winding elements belonging to different phases of said primary windings and shifted thereagainst, the phases of said secondary winding being connected in open star to said anodes, the constituent elements of each phase of the secondary winding being so composed of different elements belonging to the phases of the primary winding that balanced current-flow condition in said secondary winding is accompanied by balanced voltage and current condition throughout the transformer.

4. In a polyphase rectifying installation as claimed in claim 3, wherein each of the secondary phases is composed of winding elements of the same number of phases in combination.

5. An interconnected balanced polyphase winding system having a relatively large number of phases connected in open star and composed of winding elements of a basal phase system different from and shifted against said polyphase winding, each phase of said interconnected polyphase winding comprising winding elements belonging to two phases of said basal phase system, the winding elements being so grouped into said two systems that a balanced current flow in one system is accompanied by balanced current and voltage condition in both of said systems.

6. In a rectifying system including a polyphase line and a polyphase rectifying device having a larger phase number than said line, a transformer interconnecting said device and said line, said transformer comprising a primary winding having basal phase windings corresponding to the phases of said line and connected thereto, and a secondary winding having a number of phases corresponding to the number of phases of said rectifying device, the phases of said secondary winding being connected in open star, each secondary phase winding being similarly composed of symmetrical winding elements belonging to different phases of the basal phase system and symmetrically shifted thereagainst.

7. In a rectifying system including a polyphase line having a relatively small number of basal phases and a rectifying device having a relatively large number of phases, a transformer interconnecting said device with said line, said transformer having a magnetic core corresponding in phase number to said line, a primary winding on said core connected to said line, and a secondary winding similarly connected to said rectifying device, said secondary winding comprising winding elements of said small basal phase number, winding elements of different basal phases being interconnected in each phase of said secondary winding to constitute an open-star-connected balanced polyphase winding each phase of which being symmetrically composed of similar constituent winding elements of said smaller basal phase number and symmetrically shifted thereagainst.

8. In a rectifying system, a polyphase supply line, rectifier apparatus having anodes greater in number than the number of phases of said line, and transformer means providing an operative connection between said line and said apparatus and comprising primary winding means connected to said line and providing phases of number equal to the number of phases of said line and secondary winding means having a neutral point and providing rectifier supply phases of number equal to the number of said anodes, each of such rectifier supply phases being comprised of serially-connected secondary winding elements inductively related respectively to different primary phases, the free end of one of said secondary winding elements being connected to said neutral point, the free end of the other of said secondary winding elements being connected to one of said anodes.

9. In a rectifying system, a polyphase supply line, rectifier apparatus having anodes greater in number than the number of phases of said line, and transformer means providing an operative connection between said line and said apparatus, said transformer means comprising primary winding means having phases connected respectively to the respective phases of said line and star-connected secondary winding means having a neutral point and providing supply phases for said rectifier apparatus equal in number to the number of anodes thereof, serially-connected secondary winding elements forming part of said secondary winding means and providing one of the phases thereof, one of such elements being connected to said neutral point and being inductively associated with one of the primary phases, another of such elements being connected to one of said anodes and being inductively associated with a phase of said primary winding means different than said last-mentioned phase.

10. In a rectifier system, a polyphase line, a direct-current line, transformer apparatus comprising primary windings connected to said polyphase line and secondary windings, arranged in two distinct sets, one set comprising star-connected straight phase windings, each phase being induced by primary windings of a single phase, the other set comprising star-connected zigzag phase windings, each phase being composed of winding elements induced by primary windings of more than one phase, two sets of rectifier elements connected in star to the end terminals of said two sets of star-connected secondary transformer windings, the two star points of said windings being connected to one direct-current line, the two star points of said rectifier elements being connected to the other direct-current line.

11. In a polyphase rectifier installation, the combination with a polyphase line and polyphase rectifying device, of a transformer interconnecting said device and said line, said transformer having a plurality of primary phase windings connected to said line and cooperating secondary phase windings connected in star to the phases of said rectifier, each phase of said secondary winding being composed of winding elements induced by primary windings of two different phases.

12. The combination with a polyphase rectifier, of a polyphase supply transformer therefor having a plurality of phase windings connected in star to the phases of said rectifier, each phase winding being composed of serially-connected winding elements of a plurality of different phases.

13. The combination with a polyphase rectifier, and a polyphase transformer for supplying the same, said transformer having a primary winding of relatively small basal phase number, the phase number of said rectifier being a multiple of the phase number of said primary winding, and a secondary star-connected winding cooperating with said primary winding, the neutral star point constituting one direct-current terminal, and the end terminals of said star winding being connected to the phases of said rectifier, said secondary winding comprising a plurality of star-connected winding elements of the basal phases constituting a balanced polyphase system, the open end of each of said basal phase elements having serially-connected thereto an additional winding element of a different basal phase.

14. The combination with a three-phase line, and a polyphase rectifier having a phase number which is a multiple of three, of a transformer for supplying said rectifier from said line, said transformer comprising a three-phase primary winding, and a secondary winding corresponding in phase number to said rectifier, said secondary winding comprising a plurality of star-connected winding elements of the primary phases, each end point of said star-connected winding elements having connected thereto an additional winding element of a differet primary phase, the end points of said additional winding elements being connected to the phases of said rectifier.

15. The combination with a polyphase line and a polyphase rectifier comprising a cathode and a plurality of anodes, of a transformer for supplying said anodes from said line, said transformer comprising a polyphase core, and a plurality of secondary phase windings on said core connected to said rectifier anodes, each of said secondary phase windings comprising coils belonging to two different core phases of said transformer.

16. In a current-rectifying system, a polyphase alternating-current line, a direct-current line, metallic-vapor rectifier apparatus having anodes, transformer means providing a current supply source for said apparatus, said transformer means and said apparatus being connected between said lines, polyphase primary windings forming part of said transformer means and being connected to said alternating-current line, and star-connected secondary windings forming part of said transformer means and having a neutral point providing a connection to one side of said direct-current line, certain of said secondary windings comprising winding portions serially-connected with respect to each other and each corresponding in phase with a primary winding different than the primary winding with which the other corresponds in phase.

17. In a current-rectifying system, an alternating-current line, a direct-current line, means providing for current-rectifying action between said lines, and cooperating winding units forming part of said means and providing an operating phase, said units being of different phase with respect to each other.

18. In a current-rectifying system, an alternating-current line, a direct-current line, means providing for current-rectifying action between said lines, and cooperating winding units forming part of said means and providing an operating phase, said units being of different phase with respect to each other and with respect to said operating phase.

19. In a current-rectifying system, an alternating-current line, a direct-current line, means providing for current-rectifying action between said lines, and star-connected windings forming part of said means and providing operating phases, certain of said windings comprising winding portions of different phase with respect to each other.

20. In transformer apparatus, polyphase primary winding means, secondary winding means providing phases greater in number than the primary phases, and cooperating winding units forming part of said secondary winding means and providing one of the secondary phases, said units being of different phase with respect to each other and corresponding in phase respectively with certain of the primary phases.

21. In transformer apparatus, polyphase primary winding means, secondary winding means providing phases greater in number than the primary phases, and star-connected windings forming part of said secondary winding means and providing certain of the secondary phases, certain of said windings comprising winding portions of different phase with respect to each other and corresponding in phase respectively with certain of the primary phases.

22. In transformer apparatus, polyphase star-connected primary winding means, secondary winding means providing phases greater in number than the primary phases, and star-connected windings forming part of said secondary winding means and providing certain of the secondary phases, certain of said windings comprising winding portions of different phase with respect to each other and corresponding in phase respectively with certain of the primary phases.

23. In a current-rectifying system, an alternating-current line, a direct-current line, and means providing for current-rectifying action between said lines; said current-rectifying means including transformer apparatus comprising polyphase star-connected primary winding means, secondary winding means providing phases greater in number than the primary phases, and star-connected windings forming part of said secondary winding means and providing certain of the secondary phases, certain of said windings comprising winding portions of different phase with respect to each other and corresponding in phase respectively with certain of the primary phases.

In testimony whereof I have signed my name to this specification.

JULIUS JONAS.